Patented Apr. 4, 1944

2,345,962

UNITED STATES PATENT OFFICE 2,345,962

PROCESS FOR PRODUCING RESIN OF THE COUMARONE INDENE TYPE

Edwin L. Cline, Philadelphia, Pa., assignor to Allied Chemical & Dye Corporation, New York, N. Y., a corporation of New York No Drawing. Application January 28, 1942, Serial No. 428,547

8 Claims. (Cl. 260—81)

This invention relates to the treatment of resin crudes such as crude naphtha for the production of improved resin products by polymerization.

Resin crudes, which may contain coumarone, indene, styrene, styrene homologs and analogous polymerizable substances, have heretofore been subjected to various refining operations in an effort to improve the quality of the resin subsequently obtained from the oil by polymerization. The object of these refining operations has been to remove or modify constituents of the crude which would otherwise give the resin subsequently obtained undesirable physical properties such as dark color, low melting point and other undesirable characteristics. Careful redistillation, for example, has been employed, but generally has not been effective in itself substantially to improve the quality of the resin subsequently produced. Pretreatment with sulfuric acid has also been proposed for certain of these resin crudes, but has been found effective for only a limited class of crudes to improve the quality of the resin subsequently obtained. The methods previously used, moreover, to improve the quality of resin produced from crude naphtha generally result in a substantial loss of polymerizable constituents of the crude. Thus, in the sulfuric acid treatment, an acid sludge is formed and it is only with difficulty that a by-product of limited usefulness can be recovered from this sludge.

It is an object of this invention to provide an improved method for treating resin crudes such as crude naphtha, whereby a greatly improved resin product is obtained and better use is made of the polymerizable constituents of the crude than in processes heretofore known.

I have discovered that when a resin crude such as crude naphtha is pretreated with a small quantity of acid activated natural clay at the temperature conditions hereinafter specified, the dark resin-forming constituents and other constituents of the crude which tend to give a resin produced therefrom undesirable properties are selectively polymerized by the clay, constituents which tend to inhibit polymerization are removed, and a refined resin oil may be separated by distillation from the constituents thus polymerized and removed, from which refined oil a resin of greatly improved properties may be derived by polymerization.

Two resin products are thus produced by the process of my invention: A dark resin suitable for varnish manufacture and similar uses is obtained by the above-described selective prepolymerization, while a colorless or substantially colorless and odorless resin having very desirable physical characteristics, e. g. a resin of plastic grade, may be obtained from the refined resin oil separated after the pretreatment. I have found that not only is it possible to produce a greatly improved final resin product as above indicated from a crude treated in accordance with my invention, but the total amount of resin obtained from a crude by the two polymerizations of my invention is greater than the amount obtainable by an apparently complete single polymerization of the crude with activated clay.

The process of my invention is applicable to resin crudes such as may be obtained by fractionation of drip oil (oil which settles out of mains through which hydrocarbon gases such as coal-distillation gas or water gas flows), light oil (the light oil distillates from the wash oil used to wash coke-oven gases or carburetted water gas), distillate from tars such as coal tar, water-gas tar and oil-gas tar, coke oven distillates, cracked and reformed petroleum distillates, and similar oils. These oils are generally fractionated and a fraction boiling within the range of about 125° to 210° C. is taken as the resin crude. When it is desired to work with a particularly impure crude oil fraction, the crude oil fraction may be subjected to suitable preliminary purification treatments such as redistillation or chemical treatment, e. g. sulfuric acid treatment, to remove impurities before carrying out pre-polymerization in accordance with my invention. The fractions treated in accordance with this invention contain such polymerizable constituents as styrene, indene, coumarone and styrene homologs, i. e. methyl styrenes, particularly para methyl styrene and smaller amounts of ortho methyl styrene, as well as color and odor-forming bodies and other undesirable constituents. Some or all of the constituents enumerated in the preceding sentence may be present; the particular polymerizable constituents present in such fractions will vary depending upon the particular fraction selected, the source thereof and the pretreatment imparted thereto. It should be appreciated that the presence of as much as .01% color-forming impurity is sufficient to impart objectionable color to the resin.

The activated clay employed for the pre-polymerization of the crude in accordance with my invention is a natural clay such as fuller's earth which has been subjected to acid treatment, e. g. treatment with sulfuric acid, then washed, or neutralized and washed, to remove all or substantially all of the treating acid, and thereafter dried. An example of an activated clay which may be used in my process is the product sold commercially as "Super-filtrol," which is a neutral acid-activated natural clay.

When a resin crude such as crude naphtha is treated with a neutral acid-activated natural clay as above described, a portion of the unsaturated constituents of the crude undergoes polymerization. As above indicated, I have discovered that the color-forming bodies, i. e. bodies which tend to give a dark color to a resin produced from the crude, and other undesirable constituents of the crude which adversely affect the properties of a resin made from the crude, are preferentially polymerized by the catalytic action of the activated clay on the crude and at the same time substances which tend to inhibit polymerization are removed. Depending on the quantity and character of undesirable constituents present in the crude and the properties desired in the final resin product, from about 5% to 50% of the available resin-forming constituents of the crude should be polymerized during the pre-polymerization with activated clay.

In carrying out the process of my invention, the resin crude in the liquid phase is maintained in contact with the activated clay until the desired pre-polymerization has taken place. This may be accomplished, for example, by suspending the clay in the crude and agitating or by flowing the crude through a bed of activated clay. I have found it desirable to carry out the clay treatment in the absence of air, for example, by providing an atmosphere of carbon dioxide. A quantity of clay up to about 6% by weight of the crude being treated, particularly 1% to 3%, has been found advantageous for the process of my invention. The time of treatment generally varies from about one to three hours, and a temperature of from 60 to 110° C., preferably in the neighborhood of 80 to 100° C. may advantageously be maintained in the zone where contact of the activated clay with the resin crude is effected.

After separation of the clay from the resin crude, for example by filtration, the crude is distilled at a temperature below about 190° C., preferably by vacuum of steam distillation, to produce a refined resin oil as distillate and a preliminary resin product as residue. The resin produced by this pre-polymerization step is generally a resin of varying color similar to the resin product obtainable by the usual single-step complete polymerization of the resin crude without pre-polymerization in accordance with my invention. This resin is suitable for a number of uses such as varnish manufacture.

The refined distillate may thereafter be subjected to polymerization, either by prolonged heating or by catalytic action, depending upon the character of resin desired and the particular polymerizable constituents contained in the resin oil. For example, when a crude naphtha obtained from drip oil is treated in accordance with my invention, the subsequent polymerization may be brought about by prolonged heating, by further treatment with activated clay, or by treatment with other catalysts such as sulfuric acid, Florida fuller's earth, stannic chloride, boron fluoride, or aluminum chloride. The refined distillate thus polymerized is distilled to recover the second improved resin product as the residue in the still.

The resin obtained in the second polymerization shows great improvement in color, odor, melting point, and other characteristics over the resin obtained when the crude is not pretreated with activated clay. Moreover, when activated clay is used for the subsequent polymerization, the total clay required in the two polymerization steps is less than the amount of clay which would be required for a single polymerization of the original crude, and, as noted above, the total amount of resin produced by the two polymerizations is greater than the amount obtainable by a single-step clay polymerization.

The following examples are illustrative of my invention:

*Example 1*

A sample of drip oil crude solvent naphtha, a distillation fraction of boiling range 125° to 155° C. containing 32% polymerizable material, as determined by polymerization with stannic chloride, was agitated with 1% of its weight of "Super-filtrol" for one hour at about 100° C. 7% of the available polymerizable material was polymerized during this treatment. The mixture was filtered and the filtrate was distilled to separate a refined naphtha as distillate and the resin resulting from the pre-polymerization as residue. The refined naphtha was agitated for four hours in an atmosphere of carbon dioxide with 6% of its weight of "Super-filtrol" which had been dried for four hours at 150° C. prior to use. The remaining 93% of polymerizable material was polymerized during this operation. After separation of the clay the resin was recovered by distillation. The resin thus obtained had a color of 0+ on the standard C scale.

For purposes of comparison, another sample of the same crude was polymerized by agitating for four hours in a carbon dioxide atmosphere with 6% of dried "Super-filtrol." The resin thereby obtained accounted for 67% of the total polymerizable materials in the crude and had a color of C-⅛. By operation in accordance with the invention, therefore, there was obtained a higher yield (93%) of a better quality resin than that obtained by the usual polymerization process, and there was obtained an additional quantity of pre-polymerized resin suitable for various uses.

*Example 2*

A sample of the same crude as in Example 1 was agitated for one hour with 2% of its weight of "Super-filtrol" and the resin thus produced was recovered as in Example 1. 13% of the available polymerizable material was polymerized during this operation. The refined naphtha distillate was agitated for four hours in a carbon dioxide atmosphere at about 100° C. with dried "Super-filtrol," whereupon the remaining 87% of polymerizable material was polymerized. A resin having a color of 0+ on the C scale was recovered from this second polymerization.

*Example 3*

A sample of the same crude as in Example 1 was agitated for about two hours at 100° C. with 3% of its weight of "Super-filtrol." The prepolymer was recovered as in Example 1. 18% of the polymerizable constituents was polymerized during this operation. The refined naphtha distillate was then polymerized with 6% of its weight of dried "Super-filtrol" for four hours in a carbon dioxide atmosphere at about 100° C. The remaining 82% of polymerizable constituents was polymerized in this operation. A resin was recovered which had a color of 0+ on the C scale.

*Example 4*

A sample of a close-boiling styrene fraction (boiling range 140° to 152° C.) prepared by fractional distillation of drip oil crude solvent and containing 43.6% styrene by weight was washed with three successive portions, each 10% by volume of the sample, of a saturated solution of sodium bisulfite in water. The extracted crude was washed twice with water and filtered to remove suspended water. The styrene fraction thus purified was agitated with 6% of its weight of "Super-filtrol" for one hour at 100° C. Resinification of 44% of the available styrene took place during this operation. The resinous prepolymer recovered as in Example 1 had a color of C-½ and a melting point of 50° C. The refined naphtha distillate was then agitated with 6% by weight of "Super-filtrol" for one hour at 100° C. The remaining 56% of available styrene was completely polymerized in that time. The resulting resinous product had a color of C-1/16.

*Example 5*

Drip oil crude solvent (boiling range 125°-155° C.) was purified by agitation for one hour with 2% of its weight of "Super-filtrol" at 100° C. Pre-polymerization of 15% of the available resin-forming constituents was accomplished by this treatment. Purified crude was separated from dark pre-polymer by distillation at reduced pressure (one inch of mercury) after removal of spent clay by filtration. The purified crude was then agitated in a carbon dioxide atmosphere for four hours at 100° C. with 15% by weight of non-activated fuller's earth from Attapulgus, Georgia. A resin having a color of C-⅛ was recovered from the polymerized oil. 64% of the polymerizable constituents of the crude was polymerized during the above operations.

*Example 6*

A sample of the same crude as in Example 5 was pre-polymerized as described in that example and the product separated into a resinous prepolymer and a refined naphtha distillate. The distillate was then agitated for seven hours at 100° C. in a carbon dioxide atmosphere with 6% of its weight of a Florida fuller's earth which had been previously dried. 80% of the available resin-forming constituents in the crude was polymerized in these operations.

*Example 7*

A sample of the same crude as in Example 5 was subjected to pre-polymerization as described in that example. The refined naphtha obtained by distillation of the pre-polymerized crude was then agitated for six hours at 100° C. in a carbon dioxide atmosphere with 10% of its weight of Florida fuller's earth which had been previously dried. A total resin yield of 95%, based on available resin-forming constituents, was thereby obtained.

*Example 8*

A sample of drip oil crude "Hi-flash" (boiling range 170°-205° C.) was agitated with 3% by weight of "Super-filtrol" for two hours at 100° C. in a carbon dioxide atmosphere. The treated crude was then filtered and distilled at reduced pressure (20 mm. of mercury). The pre-polymer recovered from the still residue was a dark resin (color C-4) which melted at 111° C. and had an undesirable odor. Resinification of 10% of the available resin-forming constituents in the crude occurred during the pre-polymerization. The refined naphtha obtained by distillation was water white in color. A portion of this refined naphtha was polymerized at 70° C. with stannic chloride to give an improved resin product having a color of C-½. As a basis of comparison, a sample of the original crude "Hi-flash" was polymerized with stannic chloride without pre-polymerization with "Super-filtrol." The resulting resin had a color C-1½.

*Example 9*

Another portion of the refined naphtha obtained as in Example 8 was polymerized at 100° C. with 10% by weight of Florida fuller's earth. A practically odorless resin of color C-¾ and melting point 119.5° C. was thus obtained. 96% of the available resin-forming constituents of the crude was polymerized during the two polymerizations. As a basis of comparison, the original crude was treated with Florida fuller's earth in an attempt to bring about polymerization without preliminary activated-clay treatment. Under the same conditions of operation the same amount of catalyst produced no polymerization on the untreated crude.

*Example 10*

Another portion of the refined naphtha obtained in Example 8 was polymerized at 100° C. with 6% by weight of "Super-filtrol." A practically odorless resin of color C-½ and melting point 124.5° C. was recovered from this polymerization. 100% of the available resin-forming constituents was polymerized in the two polymerizations. When the original crude was treated with "Super-filtrol" to produce a resin product without preliminary removal of undesirable constituents in accordance with this invention, the entire product obtained was a dark resin of color C-4, melting point 111° C. and foul odor.

*Example 11*

A portion of the refined naphtha of Example 8 was polymerized by heating in a sealed glass vessel at 180° C. for sixteen hours. The resin recovered from this polymerization had a color of 0+ and a melting point of 140° C. The resin obtained by heat polymerization of the untreated original crude had a color of C-1 and a melting point of 134.5° C.

*Example 12*

A portion of the refined naphtha of Example 8 was polymerized with 66° Bé. sulphuric acid at 0° C. A resin of melting point 127° C. was obtained as compared to a resin of melting point 116° C. prepared from the original crude without preliminary polymerization in accordance with this invention.

The resin scale hereinabove used is the customary resin color scale, which scale is made by mixing three stock solutions in the proportions indicated in the following table, thereby obtaining the colors indicated in this table; namely, stock solution A constituted of 40 cc. of 33.5% hydrochloric acid and 1560 cc. of water; stock solution B made by triturating 450 grams of C. P. ferric chloride ($FeCl_3.6H_2O$), 270 cc. of solution A and filtering, using the clear filtrate for stock solution B; and stock solution C made by triturating 60 grams of C. P. cobalt chloride ($CoCl_2.6H_2O$) and 60 cc. of solution A and filtering, using the filtrate for stock solution C.

| Color number | Volumes in cubic centimeters | | | | |
|---|---|---|---|---|---|
| | (A) | (B) | (C) | Water | Standard "C" series |
| C 1/16 | 21 | | | | 3 of #1/4. |
| C 1/8 | 18 | | | | 6 of #1/2. |
| C 1/4 | 12 | | | | 12 of #1/2. |
| C 3/8 | 6 | | | | 18 of #1/2. |
| C 1/2 | 125 | 0.5 | 0.50 | | |
| C 3/4 | | | | | 12 of #1/2 plus 12 of #1. |
| C 1 | 125 | 1.0 | 0.75 | | |
| C 1 1/4 | | | | | 12 of #1 plus 12 of #1 1/2. |
| C 1 1/2 | 125 | 1.4 | 0.95 | | |
| C 2 | 125 | 2.0 | 1.25 | | |
| C 2 1/2 | 125 | 2.8 | 1.60 | | |
| C 3 | 125 | 4.0 | 2.00 | | |
| C 3 1/2 | 15 | 6.0 | 2.00 | 110 | |
| C 4 | 15 | 8.0 | 2.00 | 110 | |
| C 5 | 15 | 10.0 | 2.75 | 85 | |
| C 6 | 10 | 20.0 | 5.0 | 90 | |
| C 7 | | 40.0 | 7.5 | 100 | |
| C 8 | | 65.0 | 5.0 | 50 | |
| C 9 | | 125.0 | 10.0 | 27.5 | |
| C 10 | | 125.0 | 10.0 | | |

The solutions should be mixed well and about 25–28 cc. of each of the above indicated mixtures placed in a 1 oz. test bottle, each bottle labeled with its number, and the bottle sealed with sealing wax to prevent evaporation of water and HCL.

To determine the color of a resin, a 2 gram sample thereof is dissolved in 25 cc. of benzol and the depth of the color of the resin solution thus produced is compared with the standard colors. If the sample lies between two consecutive numbers, its color is reported as the higher one.

Resins having a color below C $\frac{1}{16}$, e. g. 0+, are substantially water-white.

The term "resin crude" as used in the claims is intended to denote a resin source such as crude naphtha or similar oil which contains such polymerizable constituents as styrene, styrene homologs, coumarone, indene, or analogous substances, as well as color- or odor-forming bodies or other undesirable constituents.

Since certain changes may be made in carrying out the above process without departing from the scope of the invention, it is intended that all matter contained in the above description shall be interpreted as illustrative and not in a limiting sense.

I claim:

1. In a process for producing a resin from a resin crude, the polymerizable component of which consists predominantly of material selected from the group consisting of styrene, styrene homologs, indene and coumarone, the improvement which comprises treating the crude with activated clay to polymerize selectively the dark resin-forming bodies of the polymerizable component of the crude and thereafter separating the polymer thus formed from unpolymerized material and polymerizing the latter.

2. A process for producing a resin from a resin crude, the polymerizable component of which consists predominantly of material selected from the group consisting of styrene, styrene homologs, indene and coumarone, which process comprises treating the crude in the liquid phase with a small amount of neutral acid-activated natural clay to polymerize selectively dark resin-forming constituents while controlling the polymerization so as not to polymerize more than about 50% of the polymerizable component of the crude, thereafter distilling to separate the polymer thus formed from unpolymerized material and polymerizing the unpolymerized material.

3. A process for producing a resin from a resin crude, the polymerizable component of which consists predominantly of material selected from the group consisting of styrene, styrene homologs, indene and coumarone, which process comprises agitating the crude for about one to three hours at about 60 to 110° C. with activated clay, thereafter distilling to separate a refined resin oil containing unpolymerized resin-forming material and polymerizing the resin-forming material in the resultant distillate.

4. A process for producing a resin from a resin crude, the polymerizable component of which consists predominantly of material selected from the group consisting of styrene, styrene homologs, indene and coumarone, which process comprises agitating the crude for about one to three hours at about 60 to 110° C. in the substantial absence of air with about 1% to 3% of neutral acid-activated natural clay based on the weight of the crude to polymerize selectively dark resin-forming constituents, distilling at a temperature below about 190° C. to separate a refined product containing unpolymerized material, and polymerizing the resin-forming material in the distillate.

5. A process for producing resin from a resin crude, the polymerizable component of which consists predominantly of material selected from the group consisting of styrene, styrene homologs, indene and coumarone, which process comprises treating the crude with activated clay to polymerize resin-forming constituents in the crude, discontinuing the polymerization when only a minor proportion of the polymerizable component of the crude has been polymerized, separating polymer thus formed from unpolymerized material, and carrying out further polymerization of resin-forming material in the unpolymerized material thus separated.

6. A process for producing resin from a resin crude, the polymerizable component of which consists predominantly of material selected from the group consisting of styrene, styrene homologs, indene and coumarone, which process comprises treating the crude with activated clay to polymerize selectively dark resin-forming constituents in the crude, discontinuing this polymerization when about 5% to 50% of the polymerizable component of the crude has been polymerized, distilling to separate unpolymerized material from the polymer thus formed, and carrying out further catalytic polymerization of resin-forming material in the unpolymerized material thus separated.

7. A process for producing resin from a resin crude, the polymerizable component of which consists predominantly of material selected from the group consisting of styrene, styrene homologs, indene and coumarone, which process comprises maintaining the crude in contact with activated clay at about 60 to 110° C. until about 5% to 50% of the polymerizable component of the crude has been polymerized, separating the clay from the crude, distilling the treated crude to separate unpolymerized material from resin formed in the first step, carrying out further polymerization of resin-forming material in the unpolymerized material thus separated, and distilling to recover a second improved resin product as residue.

8. A process for producing resin from a resin crude, the polymerizable component of which consists predominantly of material selected from the group consisting of styrene, styrene homologs, indene and coumarone, which process comprises agitating the crude for about one to three hours at about 80° to 100° C. in the substantial absence of air with about 1% to 3% of activated clay, separating the clay from the crude, distilling the crude at a temperature below about 190° C. to separate unpolymerized material from the polymer formed in the first step, and treating the unpolymerized material thus separated to bring about further polymerization of resin-forming material.

EDWIN L. CLINE.